United States Patent [19]

Spivack

[11] 4,093,587
[45] June 6, 1978

[54] TRISUBSTITUTED HYDROXYPHENYLALKANOIC ACID ESTER AND AMIDE STABILIZED COMPOSITIONS

[75] Inventor: John D. Spivack, Spring Valley, N.Y.

[73] Assignee: Ciba-Geigy Corporation, Ardsley, N.Y.

[21] Appl. No.: 682,236

[22] Filed: May 3, 1976

Related U.S. Application Data

[60] Division of Ser. No. 490,835, Jul. 23, 1974, Pat. No. 3,984,460, which is a continuation-in-part of Ser. No. 400,745, Sep. 25, 1973, abandoned.

[51] Int. Cl.² .............................................. C08K 5/20
[52] U.S. Cl. ..................... 260/45.8 NE; 260/45.85 B; 260/45.85 S; 260/45.9 NC; 260/398.5
[58] Field of Search ............... 260/45.85 B, 45.9 NC, 260/45.85 S, 45.8 NE, 398.5

[56] References Cited

U.S. PATENT DOCUMENTS

| Re. 27,004 | 12/1970 | Meier et al. ................. 260/45.85 B |
| 3,282,939 | 11/1966 | Spivack et al. ............. 260/45.9 NC |
| 3,285,855 | 11/1966 | Dexter et al. ............... 260/45.85 B |
| 3,642,868 | 2/1972 | Dexter et al. ............... 260/45.85 B |
| 3,644,482 | 2/1972 | Dexter et al. ............... 260/45.85 B |
| 3,646,110 | 2/1972 | Eggensperger et al. ..... 260/45.85 B |
| 3,654,349 | 4/1972 | Shen et al. .................. 260/45.85 B |
| 3,677,965 | 7/1972 | Dexter et al. ............... 260/45.9 NC |
| 3,763,166 | 10/1973 | Dexter ........................ 260/288 C |
| 3,984,460 | 11/1976 | Spivack ....................... 260/45.9 NC |

FOREIGN PATENT DOCUMENTS

| 1,337,163 | 7/1963 | France ......................... 260/473 S |
| 1,436,393 | 3/1966 | France ......................... 260/473 S |
| 1,936,280 | 1/1970 | Germany ...................... 260/473 S |
| 2,133,374 | 1/1972 | Germany ...................... 260/473 S |
| 874,236 | 8/1961 | United Kingdom ......... 260/473 S |

*Primary Examiner*—V.P. Hoke
*Attorney, Agent, or Firm*—Luther A. R. Hall

[57] ABSTRACT

The compounds are esters and amides of trialkylhydroxyphenylalkanoic acid having the formula

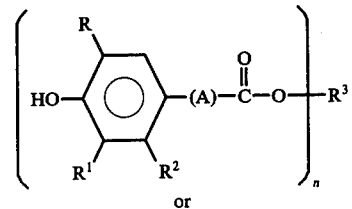

or

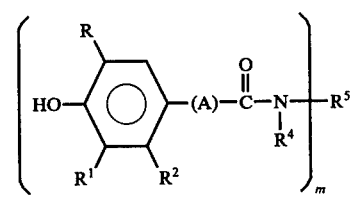

wherein R, $R^1$ and $R^2$ are independently lower alkyl or cycloalkyl groups, $R^3$ is hydrogen, alkyl, cycloalkyl, alkylene, phenyl, phenyl substituted by alkyl groups, alkylthioethyl, thiobis-alkylene, alkyleneoxyalkylene, polyoxyalkylene or a polyvalent cyclic or acyclic hydrocarbon radical, $R^4$ is hydrogen, lower alkyl, cycloalkyl, $R^5$ is hydrogen, alkyl, phenyl, phenyl substituted with alkyl groups, alkylene, polyoxyalkylene or polyvalent cyclic or acyclic hydrocarbon radical, A is lower alkylene, m is 1 to 4 and n is 1 to 6.

The ester compounds of this invention are prepared via usual esterification procedures from a suitable alcohol and an acid of the formula I

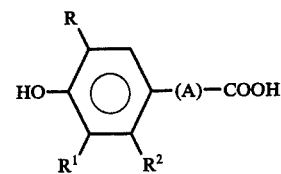

or an acid halide or acid anhydride thereof. The higher alkyl esters can also be prepared from the lower alkyl ester, especially the methyl ester of the above represented compounds, by transesterification with a higher alkanol.

The amide compounds of this invention are prepared by usual amidation procedures by reacting a carboxylic acid of formula I or an acid chloride or anhydride or a lower alkyl ester thereof with the appropriate amine.

The compounds are useful as stabilizers for organic materials, especially polyolefins, which deteriorate upon exposure to light and heat.

22 Claims, No Drawings

TRISUBSTITUTED HYDROXYPHENYLALKANOIC ACID ESTER AND AMIDE STABILIZED COMPOSITIONS

This application is a divisional of copending application, Ser. No. 490,835, filed July 23, 1974, now U.S. Pat. No. 3,984,460, issued Oct. 5, 1976, which in turn is a continuation-in-part of application Ser. No. 400,745, filed Sept. 25, 1973, now abandoned.

Detailed Disclosure

This invention pertains to esters and amides of hindered hydroxyphenylalkanoic acids and to organic materials normally subject to oxidative, thermal and UV light deterioration stabilized with said ester or amide compounds. More specifically, the compounds of this invention are those having the formula F-1 or F-2:

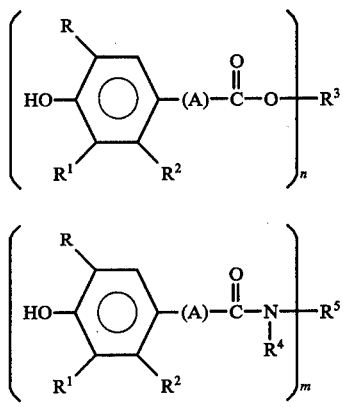

wherein

R, $R^1$ and $R^2$ are independently lower alkyl or 1 to 8 carbon atoms, cycloalkyl of 5 to 6 carbon atoms, provided that there are not more than 2 cycloalkyl groups, or $R^1$ and $R^2$ together are a butylene chain which, together with the phenyl ring, form a tetrahydronaphthyl group, $R^3$ is hydrogen, alkyl of 1 to 30 carbon atoms, cycloalkyl of 5 to 6 carbon atoms, alkylene of 2 to 12 carbon atoms, cycloalkylene of 5 to 8 carbon atoms, alkylene of 7 to 10 carbon atoms containing a cycloalkane group in the chain, phenyl, phenyl substituted with alkyl groups, said alkyl groups having 1 to 18 carbon atoms, alkylthioethyl of 5 to 27 atoms in the chain, thiobis-alkylene of 5 to 9 atoms in the chain, alkyleneoxyalkylene of 5 to 9 atoms in the chain, polyoxyalkylene of 8 to 101 atoms or a polyvalent cyclic or acyclic hydrocarbon radical of 3 to 10 carbon atoms, $R^4$ is hydrogen, lower alkyl or 1 to 8 carbon atoms, cycloalkyl of 5 to 6 carbon atoms, $R^4$ and $R^5$ together form a piperazinyl ring incorporating both nitrogen atoms when m is 2, or the group

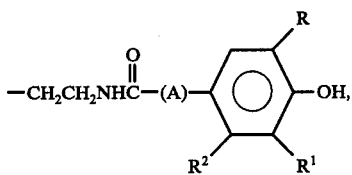

$R^5$ is hydrogen, alkyl of 1 to 24 carbon atoms, phenyl, phenyl substituted with alkyl groups, said alkyl groups having 1 to 18 carbon atoms, alkylene of 2 to 18 carbon atoms, a polyvalent cyclic or acyclic hydrocarbon radical of 3 to 8 carbon atoms or alkyleneocyalkylene of 5 to 9 carbon atoms in the chain, A is a straight or branched lower alkylene having 1 to 8 carbon atoms, m is an integer of 1 to 4, and n is an integer of 1 to 6.

The R, $R^1$ and $R^2$ groups can be straight or branched lower alkyl groups having 1 to 8 carbon atoms as for example, methyl, ethyl, propyl, butyl, pentyl, heptyl or octyl. R, $R^1$ and $R^2$ can be cycloalkyl of 5 to 6 carbon atoms such as cyclopentyl or cyclohexyl.

Preferably R is a branched alkyl group of 3 to 8 carbon atoms such as isopropyl, sec-butyl, tert-butyl, sec- and tert-amyl, sec-and tert-hexyl, sec- and tert-heptyl or sec- and tert-octyl. Most preferably R is tert-butyl.

$R^1$ and $R^2$ are preferably an alkyl group of 1 to 3 carbon atoms such as methyl, ethyl and n-propyl. Most preferably $R^1$ and $R^2$ are methyl.

The $R^3$ group can be alkyl of 1 to 30 carbon atoms such as methyl, n-butyl, n-octyl, n-dodecyl, n-octadecyl, n-tetracosanyl or n-triacontanyl. Preferably $R^3$ is an alkyl group of 1 to 18 carbon atoms such as n-dodecyl or n-octadecyl.

The $R^3$ group also is cycloalkyl of 5 to 6 carbon atoms, preferably cyclohexyl.

$R^3$ is also phenyl or phenyl substituted with alkyl groups, said alkyl groups having 1 to 18 carbon atoms. The substituents may be methyl, isopropyl, tert-butyl and tert-octyl. Substitution in the ortho or para positions of the phenyl ring is especially preferred. Preferably $R^3$ is phenyl substituted with alkyl groups having 1 to 12 carbon atoms and most preferably 1 to 18 carbon atoms such as two tert-butyl groups.

$R^3$ can also be alkylthioethyl of 5 to 27 atoms in the chain and having the general structure $-CH_2CH_2SR°$ where R° is alkyl of 2 to 24 carbon atoms such as n-octyl, n-dodecyl, n-octadecyl and n-tetracosanyl, preferably $R^3$ is alkylthioethyl of 5 to 21 atoms in the chain where R° is 2 to 18 carbon atoms.

Where n is 2, $R^3$ is alkylene of 2 to 12 carbon atoms such as ethylene, tetramethylene, 2,2-dimethylpropylene, hexamethylene, octamethylene or dodecamethylene. Preferably $R^3$ is alkylene of 2 to 8 carbon atoms and most preferably 2 to 6 carbon atoms.

$R^3$ is cycloalkylene of 5 to 8 carbon atoms such as 1,3-cyclopentanediyl, 1,4-cyclohexanediyl and 2,2,4,4-tetramethyl-1,3-cyclobutanediyl. Preferably $R^3$ is 2,2,4,4-tetramethyl-1,3-cyclobutanediyl.

$R^3$ can also be alkylene of 7 to 10 carbon atoms containing a cycloalkane group in the chain such as 1,4-cyclohexanedimethylene and 1,5-cyclooctanedimethylene. Preferably $R^3$ is 1,4-cyclohexanedimethylene.

$R^3$ can also be thiobis-alkylene of 5 to 9 atoms in the chain such as thiodiethylene and thiodibutylene. Preferably $R^3$ is thiodiethylene. $R^3$ is also alkyleneoxyalkylene of 5 to 9 atoms in the chain such as oxydiethylene, oxydibutylene and oxydi(1,2-propylene). Preferably $R^3$ is oxydiethylene.

$R^3$ can also be polyoxyalkylene of 8 to 101 atoms having the general structure $-R°°(OR°°)_h-$ where R°° is a straight or branched lower alkylene of 2 to 4 carbon atoms and h is 2 to 33. R°° is ethylene, 1,2-propylene, 1,2-butylene and tetramethylene. Preferably $R^3$ is polyoxyalkylene of 8 to 11 atoms where R°° is ethylene and h is 2 to 3. Most preferably $R^3$ is polyoxyethylene of 8 atoms.

Where n is 3 to 6, $R^3$ is a polyvalent cyclic or acyclic hydrocarbon radical of 3 to 10 carbon atoms such as 1,2,3-propanetriyl, neopentanetriyl, neopentanetetrayl, 2,2-dimethyl-2,2-butanetriyl, 2,2-dimethyl-1,2,2-pentanetriyl, 1,2,3,4,5,6-cyclohexanehexayl or 1,2,3,4,5,6-hexanehexayl. Preferably $R^3$ is a polyvalent acyclic hydrocarbon radical of 3 to 7 carbon atoms and most preferably of 5 to 7 carbon atoms.

$R^4$ is lower alkyl of 1 to 8 carbon atoms such as methyl, ethyl, butyl and octyl. Preferably $R^4$ is lower alkyl of 1 to 4 carbon atoms. Most preferably $R^4$ is methyl. $R^4$ is also cycloalkyl of 5 to 6 carbon atoms, preferably cyclohexyl.

Where m is 2, $R^4$ can be the group

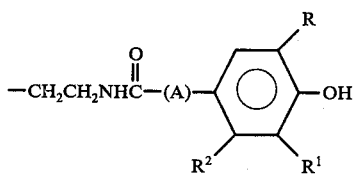

when diethylene triamine or triethylene tetramine are used in the preparation of the amides of formula F-2.

$R^5$ can be alkyl of 1 to 24 carbon atoms such as methyl, octyl, n-dodecyl or n-tetracosanyl, preferably of 1 to 18 carbon atoms such as n-octadecyl.

$R^5$ is also phenyl or phenyl substituted with alkyl groups, said alkyl groups having 1 to 18 carbon atoms. The substituents may be methyl, isopropyl, tert-butyl and tert-octyl with substitution preferably in the ortho or para positions of the phenyl ring.

Where m is 2, $R^5$ is alkylene of 2 to 18 carbon atoms such as ethylene, octamethylene and octadecamethylene. Preferably $R^5$ is alkylene of 2 to 12 carbon atoms such as ethylene, hexamethylene and dodecamethylene.

$R^5$ can also be polyoxyalkylene of 8 to 11 atoms having the general formula $-R^{\circ\circ}(OR^{\circ\circ})_k-$ where $R^{\circ\circ}$ is a straight or branched lower alkylene of 2 to 4 carbon atoms and k is 2 to 3. $R^5$ is preferably polyoxyalkylene of 8 atoms where $R^{\circ\circ}$ is ethylene and k is 2.

Where m is 3 to 4, $R^5$ is a polyvalent cyclic or acyclic hydrocarbon radical of 3 to 8 carbon atoms such as neopentanetetrayl, neopentanetriyl, 1,2,3-propanetriyl and cyclohexan1,4-diyl-1,4-dimethylene.

A is a straight or branched lower alkylene of 1 to 8 carbon atoms such as methylene, ethylene, 1,2-propylene, trimethylene, 1,1-butylidene, 2-methyl-1,1-propylidene and 1,1-octylidene. Preferably A is a straight chain alkylene of 1 to 3 carbon atoms, that is, methylene, ethylene and trimethylene, and most preferably is methylene or ethylene.

The integer m is 1 to 4 and preferably is 1 to 2.
The integer n is 1 to 6 and preferably is 1 to 4.
The esters of this invention are prepared via usual esterification procedures from a suitable alcohol and an acid of the formula

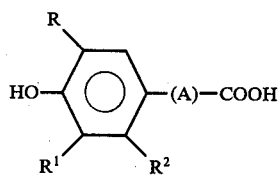

or an acid halide or acid anhydride thereof. The higher alkyl esters can also be prepared from the lower alkyl ester, especially the methyl ester of the above represented compounds, by transesterification with a higher alkanol. The above carboxylic acid derivatives which are then converted to the compounds of this invention are made in known manner as represented by the following chemical reactions:

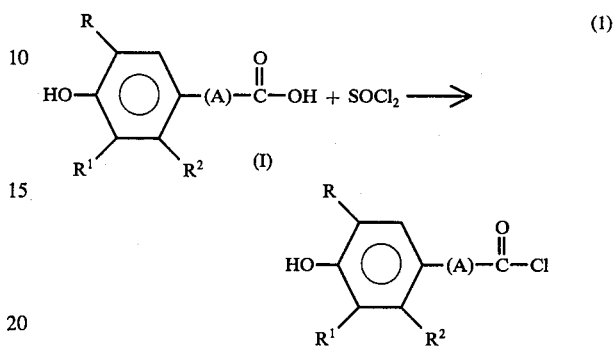

In equation (1) above, other halogenating agents such as phosphorous trichloride, phosphorus pentachloride may also be used.

The lower alkyl ester of I, e.g., methyl, is conveniently made by an acid catalyzed reaction in the presence of the lower alcohol e.g., methanol.

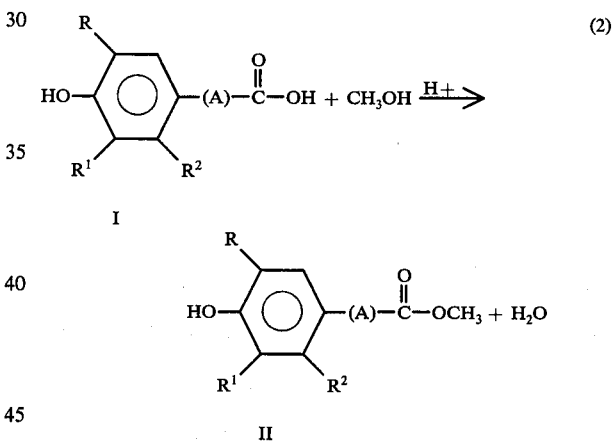

Where A is ethylene the lower alkyl ester, e.g., compounds II, are conveniently made by reaction of the starting phenol (IV) with acrylate esters, for example, as represented by reaction (3):

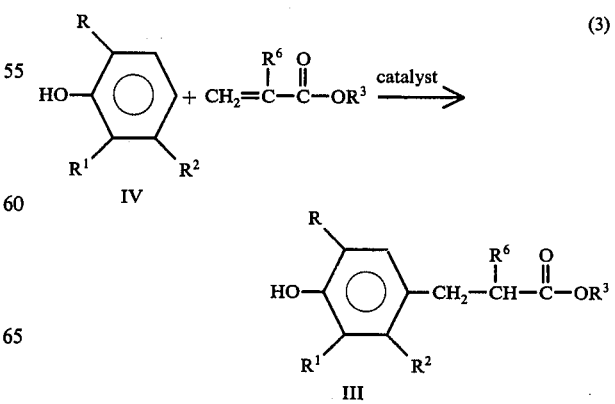

where $R^6$ is hydrogen or lower alkyl of 1 to 6 carbon atoms and $R^3$ is alkyl of 1 to 30 carbon atoms. processes of this type are disclosed for example in the U.S. Pat. No. 3,247,240 (Apr. 9, 1966) and U.S. Pat. No. 3,364,250 (Jan. 16, 1968).

Products of type III can also be made by reacting IV with acrylonitrile or a substituted acrylonitrile followed by alcoholysis of the nitrile as set out in the following reactions (4) and (4a):

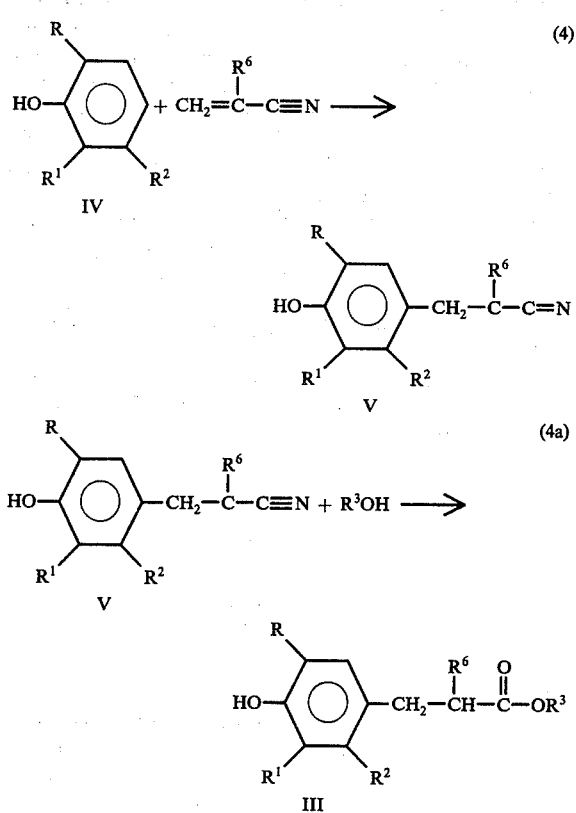

Reaction (4) is analogous to that disclosed in U.S. Pat. No. 3,121,732 (Feb. 18, 1964) for example.

Carboxylic acids I, where A is methylene are conveniently made by the reaction sequence represented by reactions 5, 5a and 5b.

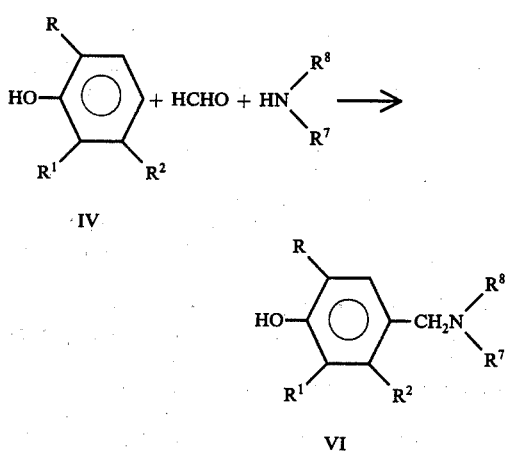

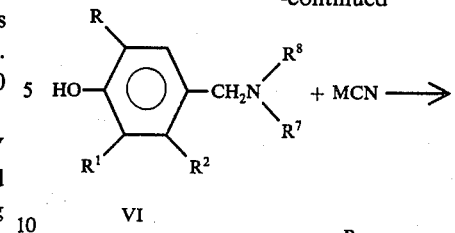

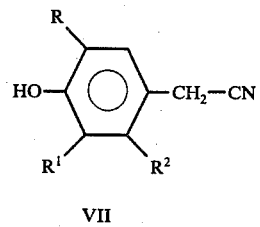

where M is an alkali metal such as sodium and potassium and $R^7$ and $R^8$ are lower alkyl of 1 to 8 carbon atoms or together make a morpholine or piperidine ring. Preferably $R^7$ and $R^8$ are methyl. (EPDM)

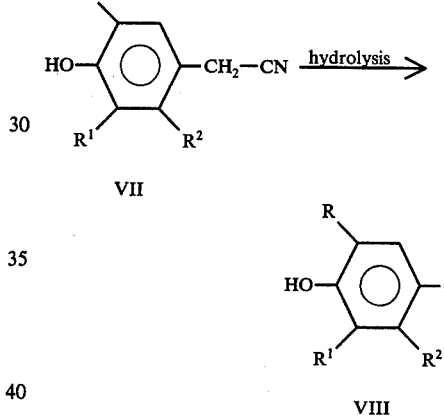

VIII is then converted to the ester stabilizers of this invention in known manner as outlined above. Synthesis of compounds of types VI and VII are detailed in the examples.

Substitution of higher aldehydes such as n-butanal and n-octanal for formaldehyde in reaction 5 leads to the preparation of acids of formula I where A is 1,1-alkylidene.

Acids of formula I can also be prepared by reaction of substituted phenolate anions with appropriate halogenoalkane carboxylic esters, amides or nitriles where A may be straight or branched alkylene of 2 to 8 carbon atoms.

Amides of this invention are prepared in known manner for example, by reacting the carboxylic acid of formula I or an acid chloride or anhydride thereof with the appropriate amine. The higher alkanamides can also be prepared from the lower alkyl ester of the acid of formula I by known amidation procedures.

Most of the 2, 3, 6 trialkylated phenols contemplated for use as starting materials to make the compounds of this invention are known compounds which are available commerically. If not available commerically, the synthesis of these starting phenols have been disclosed or their synthesis is shown in the examples. Thus, the preparation of for example, 2,6-diisopropyl-3-methyl phenol and 2,6-di-tert-butyl-3-methyl phenol is disclosed in Japanese patent application No. 70 15,491. The preparation of 2,3-dimethyl-6-tert-butyl phenol is disclosed by G. Parc in Revue de L'Institut Francais du Petrole Vol. XV, page 693 (1960).

The hindered hydroxyphenyl alkanoates and amides of this invention not only have superior stabilizing properties, but exhibit resistance to gas fading in polymeric substrates such as polypropylene multifilament knitted cloth to a high degree not shown by other antioxidants. In addition, the stabilizers of this invention confer superior processing stability to polymers, such as polypropylene, as well as being extraction resistant. This combination of properties is particularly important for textiles fabricated from synthetic polymers.

The hindered hydroxyphenyl alkanoates and amides of this invention are stabilizers of organic material normally subject to thermal and oxidative deterioration. Materials which are thus stabilized include synthetic organic polymeric substances such as vinyl resins formed from the polymerization of vinyl halides or from the co-polymerization of vinyl halides with unsaturated polymerizable compounds, e.g., vinyl esters, $\alpha,\beta$-unsaturated ketones, $\alpha,\beta$-unsaturated aldehydes and unsaturated hydrocarbons such as butadienes and styrene; poly-$\alpha$-olefins, polybutylene including copolymers of $\alpha$-olefins such as ethylene/propylene copolymer; dienes such as polybutadiene, polyisoprene, and the like, including copolymers with other monomers; polyurethanes and polyamides such as polyhexamethylene adipamide and polycaprolactam; polyesters such as polyethylene terephthalates; polycarbonates; polyacetals such as polyethylene tetephthalate polyacetal; polystyrene, polyethylene oxide; and copolymers such as those of high impact polystyrene containing copolymers of butadiene and styrene and those formed by the copolymerization of acrylonitrile, butadiene and/or styrene; natural and synthetic rubbers such as ethylene/propylene/diene copolymer (EPDM) and chlorinated rubber; polyphenylene oxide and copolymers.

Other materials which can be stabilized by the compounds of the present invention include lubricating oil of the aliphatic ester type, i.e., di(2-ethylene) azelate and other synthetic ester lubricants, pentaerythritol tetracaproate, and the like; animal and vegetable derived oils, e.g., linseed oil, fat, tallow, lard, peanut oil, cod liver oil, castor oil, palm oil, corn oil, cottonseed oil, and the like; hydrocarbon materials such as gasoline, mineral oil, fuel oil, drying oil, cutting fluids, waxes, resins and the like, salts of fatty acids such as soaps and the like; and alkylene glycols, e.g., $\beta$-methoxyethylene glycol, methoxytriethylene glycol, triethylene glycol, octaethylene glycol, dibutylene glycol, dipropylene glycol and the like.

The substrates of particular importance are olefin polymers such as polyethylene and polypropylene. Polypropylene is especially well stabilized with the compounds of this invention.

In general, the stabilizers of this invention are employed from about 0.01 to about 5% by weight of the stabilized composition, although this will vary with the particular substrate and applicatiohn. An advantageous range is from about 0.05 to about 2% and especially from about 0.1 to about 1%.

For addition to polymeric substrates, the stabilizers can be blended before polymerization or after polymerization, during the usual processing operations, for example, by hot-milling, the composition then being extruded, pressed, or the like into films, fibers, filaments, hollow speres and the like. The heat stabilizing properties of these compounds advantageously stabilize the polymer against degradation during such processing at the high temperature generally encountered. The stabilizers can also be dissolved in suitable solvents and sprayed on the surface of films, fabrics, filaments or the like to provide effective stabilization.

These compounds can also be used in combination with other additives such as sulfur-containing esters, e.g., distearyl $\beta$-thiodipropionate (DSTDP) in an amount of from 0.01 to 2% by weight of the organic material, and the like, pourpoint depressants, corrosion and rust inhibitors, dispersing agents, emulsifiers, antifoaming agents, carbon black, accelerators and other chemicals used in rubber compounding, plasticizers, color stabilizers, surface active, fillers, di-and tri-alkyl- and -alkylphenyl phosphites, heat stabilizers, ultraviolet light stabilizers, antiozonants, dyes, pigments, metal chelating agents, dyesites and the like. Often combinations such as these, particularly the sulfur containing esters, the phosphites and/or the ultraviolet light stabilizers will produce superior results in certain applications to those expected by the properties of the individual components.

The following formula represents co-stabilizers which are in certain instances very useful in combination with the stabilizers of this invention:

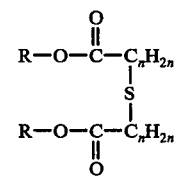

wherein R is an alkyl group having from 6 to 24 carbon atoms; and n is an integer from 1 to 6. Especially useful compounds of this type are dilauryl $\beta$-thiodipropionate and distearyl $\beta$-thiodipropionate. The above co-stabilizers are used in the amount of from 0.01 to 2% by weight of the organic material, and preferably from 0.1 to 1%.

In addition to the above noted additives that can be employed in combination with the compounds of this invention, it is often especially advantageous to employ also light stabilizers. The ligh stanbilizers are used in the amount of from 0.01 to 5% by weight of the organic material, and preferbly from 0.1 to 1%. Illustrative examples of light stabilizers are listed below.

UV-Absobers and light protection agents.

2-(2'-hydroxyphenyl)-benztriazoles, such as, for example, the 5'-methyl-, 3',5'-di-tert.-butyl-,5'-tert.-butyl- ,5'-(1,1,3,3-tetramethyl-butyl)-,5-chloro-3',5'-di-tert.- butyl, 5-chloro-3'-tert.-butyl-5'-methyl-, 3'-sec.-butyl-5'- tert.-butyl-,3'-{$\alpha$-methyl-benzyl}-5'-methyl-, 3'-{$\alpha$- methylbenzyl}-5'-methyl-5-chloro-,4'-hydroxy-, 4'- methoxy-, 4'-octoxy-, 3',50'-di-tert.-amyl-, 3'-methyl-5'- carbomethoxyethyl- or 5-chloro-3',5'-di-tert.-amyl- derivative.

2,4-bis-(2'-hydroxyphenyl)-6-alkyl-s-triazines, such as, for example, the 6-ethyl-, 6-undecyl- or 6-heptadecyl-derivative.

2-hydroxy-benzophenones, such as, for example, the 4-hydroxy-, 4-methoxy-, 4-oxtoxy-, 4-decyloxy-, 4-dodecyloxy-, 4-benzyloxy-, 4,2',4'-trihydroxy- or 2'-hydroxy-4,4'-dimethoxy-derivative.

1,3-bis-(2'-hydroxy-benzoyl)-benzenes, such as, for example, 1,3-bis-(2'-hydroxy-4'-hexyloxy-benzoyl)-benzene, 1,3-bis-(2'-hydroxy-4'-benzoyl)-benzene and 1,3-bis-(2'-hydroxy-4'-dodecyloxy-benzoyl)-benzene.

Esters of optionally substituted benzoic acids, such as, for example, phenyl salicylate, octylphenyl salicylate, di-benzoylresorcinol, bis-(4-tert.-butyl-benzoyl)-resorcinol, benzoyl-resorcinol, 3,5-di-tert.-butyl-4-hydroxybenzoic acid 2,4-di-tert.-butyl-phenyl ester, octadecyl ester or 2-methyl-4,6-di-tert.-butyl-phenyl ester.

Acrylates, such as, for example, α-cyano-β,β-diphenylacrylic acid ethyl ester or isooctyl ester, α-carbonethoxy-cinnamic acid methyl ester, α-cyano-β-methyl-p-methoxy-cinnamic acid methyl ester or butyl ester and N-(β-carbomethoxy-vinyl)-2-methyl-indoline.

Nickel compounds, such as, for example, nickel complexes of 2,2'-thio-bis-4-(1,1,3,3-tetramethylbutyl)-phenol, such as the 1:1 and 1:2 complex, optionally with other ligands such as n-butylamine, triethanolamine or N-cyclohexyl-diethanolamine; nickel complexes of bis-{2-hydroxy-4-(1,1,3,3-tetramethylbutyl)-phenyl}-sulphone, such as the 2:1 complex, optionally with other ligands such as 2-ethyl-caproic acid; nickel dibutyldithiocarbamate, nickel salts of 4-hydroxy-3,5-di-tert.-butyl-benzylphosphonic acid monoalkyl esters, such as the methyl, ethyl or butyl ester, the nickel complex of (2-hydroxy-4-methyl-phenyl)-undecyl-ketonoxime and nickel 3,5-di-tert.-butyl-4-hydroxy-benzoate.

Oxalic acid diamides, such as, for example, 4,4'-di-octyloxyoxanilide, 2,2'-dioctyloxy-5,5'-di-tert.-butyloxanilide, 2,2'-di-dodecyloxy-5,5'-di-tert.-butyl oxanilide, 2-ethoxy-5-tertiarybutyl-2'-ethyl-oxanilide, 2-ethoxy-2'-ethyl-oxanilide, N,N'-bis-(3-dimethylamminopropyl) oxalamide, mixtures of o- and p-methoxy and o- and p-ethoxy-di-substituted oxanilides and mixtures of 2-ethoxy-5-tert..-butyl-2'-ethyl-oxanilide with 2-ethoxy-2'-ethyl-5,4'-di-tert.-butyl-oxanilide.

Sterically hindered amines, such as, for example 4-benzoyloxy-2,2,6,6-tetramethylpiperidine, 4-stearoyloxy 2,2,6,6-tetramethylpiperidine, bis-(2,2,6,6-tetramethylpiperidyl)-sebacate and 3-n-octyl-7,7,9,9-tetramethyl-1,3-triaza-spiro[4,5]decane-2,4-dione.

For exemplification purposes only listed below are compounds of this invention which are useful as stabilizers as discussed above.

methyl 3-(5-t-butyl-2,3-dimethyl-4-hydroxyphenyl)-propionate ethyl 3-(5-t-butyl-2,3-dimethyl-4-hydroxyphenyl)propionate n-butyl 3-(2,3,5-tri-methyl-4-hydroxyphenyl)-propionate n-octyl 3-(5-t-butyl-2,3-diethyl-4-hydroxyphenyl)-propionate methyl 3-(2,3-dimethyl-5-t-octyl-4-hydroxyphenyl)-propionate methyl 3-(5,6,7,8-tetrahydro-4-hydroxy-3-butyl-naphthyl-1)propionate n-octadecyl 3-(5-t-butyl-2,3-dimethyl-4-hydroxyphenyl)propionate 2-(n-octadecylthio)ethyl 3-(5-t-butyl-2,3-di-methyl-4-hydroxyphenyl)propionate 2-(ethylthio)ethyl 3-(3,5-di-t-butyl-2-methyl4-hydroxyphenyl)propionate 2-(n-octylthio)ethyl 5-t-butyl-2,3-di-methyl-4-hydroxyphenylacetate cyclohexyl 3-(5-t-butyl-2,3-dimethyl-4-hydroxyphenyl)propionate neopentanetetrayl tetrakis(5-t-butyl-2,3-dimethyl-4-hydroxyphenyl)acetate neopentanetetrayl tetrakis{3-(5-t-octyl-2,3-dimethyl-4-hydroxyphenyl)propionate} neopentanetetrayl tetrakis{4-(5-t-butyl-2,3-diethyl-4-hydroxyphenyl)butyrate}

1,2,3,4,5,6-hexanehexayl hexakis{3-(5-t-butyl-2,3-dimethyl-4-hydroxyphenyl)propionate}

1,2,3-butanetriyl tris-{3-(5,6,7,8-tetrahydro-4-hydroxy-3-t-butylnaphthyl-1)propionate} methyl 5-t-butyl-2,3-dimethyl-4-hydroxyphenylacetate n-octadecyl 5-t-butyl-2,3-dimethyl-4-hydroxyphenylacetate n-butyl 5-t-butyl-2,3-dimethyl-4-hydroxyphenylacetate n-octyl 5-t-butyl-2,3-dimethyl-4-hydroxyphenylacetate n-dodecyl 5-t-butyl-2,3-dimethyl-4-hydroxyphenylacetate 2,2-dimethylpropylene bis-(5-t-butyl-2,3-dimethyl-4-hydroxyphenylacetate)

1,6-hexamethylene bis-(5-t-butyl-2,3-dimethyl-4-hydroxyphenylacetate)

p-t-octylphenyl 3-(5-t-butyl-2,3-dimethyl-4-hydroxyphenyl)propionate phenyl 3-(5-t-butyl-2,3-dimethyl-4-hydroxyphenyl)propionate o-methylphenyl 3-(5-t-butyl-2,3-dimethyl-4-hydroxyphenyl)propionate o,p-di-t-butylphenyl 3-(5-t-butyl-2,3-di-methyl-4-hydroxyphenyl)propionate 2-ethylhexyl 3-(5-t-butyl-2,3-dimethyl-4-hydroxyphenyl)propionate n-octadecyl 3-(2,3-dimethyl-5-t-octyl-4-hydroxyphenyl)propionate n-octadecyl 3-(5,6,7,8-tetrahydro-4-hydroxy-3-t-butylnaphthyl-1)propionate 2,2-dimethylpropylene bis-(5-t-octyl-2,3-dimethyl-4-hydroxyphenylacetate)

1,6-hexamethylene bis-[3-(5-t-butyl-2,3-dimethyl-4-hydroxyphenyl)propionate]

1,2-propylene bis-[3-(5-t-butyl-2,3-dimmethyl-4-hydroxyphenyl)propionate]

ethylene bis-[3-(5-isopropyl-2,3-dimethyl-4-hydroxyphenyl)propionate]

2,2-dimethylpropylene bis-(5-t-octyl-2,3-diethyl-4-hydroxyphenyl)acetate 2,2-dimethylpropylene bis-[3-(5-cyclohexyl-2,3-dimethyl-4-hydroxyphenyl)propionate]

2-methyl-1,4-pentamethylene bis [3-(2,3,5-triethyl-4-hydroxyphenyl)propionate]

1,8-octamethylene bis-[4-(2,3,5-tri-t-butyl-4-hydroxyphenyl)butyrate]

2,4-dimethyl-2,4-pentamethylene bis-[6-(5-t-butyl-2,3-dimethyl-4-hydroxyphenyl)hexanoate]

1,5-pentamethylene bis-[3-(5-t-butyl-2,3-dimethyl-4-hydroxyphenyl)propionate]

1,12-dodecamethylene bis-[3-(5-t-butyl-2,3-di-methyl-4-hydroxyphenyl)propionate]

2,2-dimethyl-1,2,2-butanetriyl tris-[3-(5-t-butyl-2,3-dimethyl-4-hydroxyphenyl)propionate]

1,2,3-propanetriyl tris[3-(5-t-butyl-2,3-dimethyl-4-hydroxyphenyl)propionate]

2,2-dimethyl-1,2,2-pentanetriyl tris(5-t-butyl-2,3-dimethyl-4-hydroxyphenyl)acetate neopentanetetrayl tetrakis[3-(5-t-butyl-2,3-dimethyl-4-hydroxyphenyl)propionate]

phenyl (5-t-octyl-2,3-dimethyl-4-hydroxyphenyl)-acetate neopentanetriyl tris-(5-t-butyl-2,3-dimethyl-4-hydroxyphenylacetate)

thiodiethylene bis-(5-t-butyl-2,3-dimethyl-4-hydroxyphenylacetate)

thiodiethylene bis-[3-(5-t-butyl-2,3-di-methyl-4-hydroxyphenyl)propionate]

ethylene bis-[3-(5-t-butyl-2,3-di-methyl-4-hydroxyphenyl)propionate]

3,6-dioxa-1,8-octamethylene bis-[3-(5-t-butyl-2,3-dimethyl-4-hydroxyphenyl)propionate]

2,2-dimethylpropylene bis-[3-(5-t-butyl-2,3-dimethyl-4-hydroxyphenyl)propionate]

2,2-dimethyl-1,2,2-pentanetriyl tris-[3-(5-t-butyl-2,3-dimethyl-4-hydroxyphenyl)propionate]

1,4-cyclohexanedimethylene bis-[3-(5-tert-butyl-2,3-dimethyl-4-hydroxyphenyl)propionate]

3-(5-tert-butyl-2,3-dimethyl-4-hydroxyphenyl)-propionamide (5-tert-butyl-2,3-dimethyl-4-hydroxyphenyl)-acetamide N-methyl-N-n-tetracosanyl-3-(2,3-dimethyl-5-tert-butyl-4-hydroxyphenyl)propionamide N-n-octyl-N-phenyl-(5-tert-butyl-2,3-dimethyl-4-hydroxyphenyl)acetamide N-cyclohexyl-3-(5-tert-octyl-2,3-dimethyl-4-hydroxyphenyl)propionamide N,N-dibutyl-3-(5-tert-butyl-2,3-dimethyl-4-hydroxyphenyl)propionamide N,N',N'',N'''-1,4-dimethylcyclohexan-1,1,4,4-tetrayl tetrakis[3-(5-tert-butyl-2,3-dimethyl-4-hydroxyphenyl)propionamide]

N-o-tolyl-N-methyl-(5-tert-octyl-2,3-dimethyl-4-hydroxyphenyl)acetamide.

The following examples are illustrative of the invention, but are not meant to limit the scope of same. In said examples, parts are by weight unless otherwise indicated and the relationship between parts by weight and parts by volume is as that between grams and cubic centimeters. The temperatures are in degrees centigrade.

EXAMPLE 1

Methyl 3-(5-tert.-butyl-2,3-dimethyl-4-hydroxyphenyl)propionate 1.53 grams of sodium metal was added in small pieces to 240.6 grams of 2-tert.-butyl-5,6-dimethylphenol warmed at 60°. The reaction mixture was then heated at 120° with stirring for 2 hours, during which time the sodium metal was completely reacted. 174 grams of methyl acrylate was then added gradually over a period of 1 hour so that the temperature was maintained at 120°. The reaction mixture was then heated at 120° to 130° for an additional four hours. 3.9 ml. of acetic acid was then added. The reaction mixture was diluted with 600 ml. of toluene and warmed to dissolve a precipitate. The toluene solution was washed successively with 2N sodium carbonate, saturated sodium chloride, water, dilute aqueous hydrochloric acid and finally with water until the water washings were almost neutral. After drying over sodium sulfate, the clear toluene solution was evaporated at 20 mm Hg. pressure and finally at 1 mm. Hg. pressure for two hours. The crude residual product was crystallized from a mixture of 450 ml. of isopropanol and 200 ml. water and kept at about 15° C overnight. The thick crystalline slurry was filtered, the filter cake being washed with a little cold isopropanol-water mixture. After drying and recrystallization, the desired product was obtained as white crystals melting at 74° to 76° C (Compound 1).

EXAMPLE 2

Methyl 3-(2,3-dimethyl-5-tert.-octyl-4-hydroxyphenyl)propionate a) 2,3-Dimethyl-6-(1,1,3,3-tetramethylbutyl)phenol 183 grams of 2,3-dimethylphenol, 168 grams of 2,4,4-trimethylpentene-1 and 28.5 grams of p-toluenesulfonic acid monohydrate were added together to one liter of toluene, the reaction mixture being heated for 9 hours at 80° to 85° C and 23 hours at 70° C. The reaction mixture was washed successively with water, saturated sodium bicarbonate and water until almost neutral. After drying over anhydrous sodium sulfate, the dried reaction mixture was concentrated at reduced pressures to yield the intermediate (a) as a crude product. Unreacted 2,3-dimethylphenol was removed from the crude by sublimation at 70° to 75° C and 0.3 mm Hg. pressure. The residual liquid was then distilled to yield pure 2,3-dimethyl-6-(1,1,3,3-tetramethylbutyl)-phenol boiling at 76° to 80° at 50 microns Hg. pressure.

b) The product was obtained by reacting 2,3-dimethyl-6-(1,1,3,3-tetramethylbutyl)phenol with methyl acrylate in a similar manner as described in Example 1. The desired product was obtained as white crystals melting at 83° to 85° C (Compound 2).

EXAMPLE 3

Methyl 3-(5,6,7,8-tetrahydro-4-hydroxy-3-tert.-butylnaphthyl-1)propionate a. 2-Tert-butyl-5,6,7,8-tetrahydro-1-naphthol To a solution of 60 grams of 5,6,7,8-tetrahydro-1-naphthol and 5.7 grams of p-toluenesulfonic acid monohydrate in 600 ml of toluene at 75° C was bubbled in about 30 grams of isobutylene over a period of 3 hours. The reaction mixture was then kept at 75° C for an additional hour. After cooling to room temperature, the reaction mixture was washed successively with water, saturated sodium bicarbonate and with water again. The toluene phase was then dried over anhydrous sodium sulfate. After removing the solvent by distillation at reduced pressure, the residue was distilled yielding 2-tert-butyl-5,6,7,8-tetrahydro-1-naphthol as a light yellow viscous liquid boiling at 97°–98° C at 0.1 mm Hg.

b. Methyl 3-(5,6,7,8-tetrahydro-4-hydroxy-3-tert butyl-naphthyl-1)propionate was obtained by reacting 5,6,7,8-tetrahydro-2-tert.-butyl-1-naphthol with methyl acrylate in an analogous manner as described in Example 1. The compound was obtained as white crystals melting at 84° to 86° (Compound 3).

EXAMPLE 4 n-Octadecyl 3-(5-tert.-butyl-2,3-dimethyl-4-hydroxyphenyl)propionate 37.9 grams of n-octadecanol and 38.8 grams of the compound of Example 1 were added to a reaction flask, dried and flushed with dry nitrogen. Then were added 1 ml of dry dimethyl sulfoxide and 56 milligrams of lithium hydride, the system flushed again with nitrogen and the reaction mixture heated to 120° C. The melt was then heated at 120° to 125° at 1 atmosphere pressure for 1 hour, at 130° for 50 minutes at 1 atmosphere and finally at 130° to 140° at 20 mm Hg. for 1.25 hours. During this period, 5.6 ml of methanol was collected. The reaction mixture was dissolved in 200 ml of toluene, neutralized with 0.5 ml of glacial acetic acid. The toluene solution was then washed successively with aqueous saturated sodium chloride solution and dried over anhydrous magnesium sulfate. The clear filtrate, after removal of drying agent, was concentrated at reduced pressures, the resulting residue being kept at 50° to 60° C and 0.3 mm Hg. for 1 hour to substantially remove all volatile material, yielding a brown residual oil. After two crystallizations from methanol-isopropanol mixtures, the desired product was obtained as white crystals melting at 55° to 57° (Compound 4).

In an analogous manner to the procedure described in Example 4, the examples shown in Table I were prepared.

EXAMPLE 5

5-tert-Butyl-2,3-dimethyl-4-hydroxyphenylacetic acid a. 6-tert-butyl-2,3-dimethyl-4-(dimethylaminomethyl)phenol To 142.4 grams of 6-tert.-butyl-2,3-dimethylphenol dissolved in 270 ml of toluene was added 144.4 grams of a 25% aqueous solution of dimethylamine at about room temperature. 65.7 grams of 36.5% aqueous formaldehyde was then added over a ten minute period to the reaction mixture initially at 15°, the temperature rising to 30° at the end of the addition. The reaction mixture was then warmed to 40° for 3 hours and finally heated at reflux (85°) for 2 hours. The reaction was diluted with about 1 liter of ether and the aqueous layer separated, the upper ether layer being washed three times with water. After drying over sodium sulfate, the organic phase was stripped to dryness at reduced pres-

TABLE I

Other 3-(3-tert.-Alkyl-5,6-dialkyl-4-hydroxyphenyl)propionates $$\left[ HO - \begin{array}{c} R \\ \phantom{HO} \\ R^1 \phantom{xx} R^2 \end{array} - CH_2CH_2\overset{O}{\underset{\|}{C}} - O \right]_n R^3$$

| Compound No. | R | R¹ | R² | R³ | n | M.P. ° C. |
|---|---|---|---|---|---|---|
| 5 | $(CH_3)_3C-$ | $CH_3$ | $CH_3$ | $n-C_{18}H_{37}-S-CH_2CH_2-$ | 1 | 49–51 |
| 6 | $(CH_3)_3C-$ | $CH_3$ | $CH_3$ | $-C_6H_{11}$ (cyclohexyl) | 1 | 87.5–89.5 |
| 7 | $(CH_3)_3C-$ | $CH_3$ | $CH_3$ | $CH_3(CH_2)_3CH(C_2H_5)-CH_2-$ | 1 | liquid[1] |
| 8 | $CH_3-C(CH_3)_2-CH_2-C(CH_3)_2-$ | $CH_3$ | $CH_3$ | $CH_3$ | $n-C_{18}H_{37}-$ | 1 | 47–50 |
| 9 | $(CH_3)_3C-$ | $R_1 + R_2 = $ cyclopentane ring $(-CH_2CH_2CH_2CH_2-)$ | | | $n-C_{18}H_{37}-$ | 1 | 59–61 |
| 10 | $(CH_3)_3C-$ | $CH_3$ | $CH_3$ | $-CH_2-C(CH_3)_2-CH_2-$ | 2 | 116–119 |
| 11 | $(CH_3)_3C-$ | $CH_3$ | $CH_3$ | $-(CH_2)_6-$ | 2 | 108–110 |
| 12 | $(CH_3)_3C-$ | $CH_3$ | $CH_3$ | $-CH_2-C(CH_2-)_3$ (tris-methylene from neopentyl) | 4 | 159–164 |
| 13 | $CH_3-C(CH_3)_2-CH_2-C(CH_3)_2-$ | $CH_3$ | $CH_3$ | $CH_3$ | $-CH_2-C(CH_2-)_3$ | 4 | 81–90 |

Note:
[1] Purified by silica gel treatment - pale yellow liquid sures yielding 176.3 grams of crude product. The crude product was crystallized from heptane, yielding white cyrstals melting at 101° to 104°.

b. 5-tert.-butyl-2,3-dimethyl-4-hydroxyphenylacetonitrile

To 48 grams of sodium cyanide dispersed in 900 ml of N,N-dimethylformamide was added with vigorous stirring at 25° to 30° C a solution of 153 grams of the compound prepared in (a) above dissolved in 200 ml of N,N-dimethylformamide. The reaction mixture was then heated with stirring at 70° to 75° for 5 hours. The reaction mixture was cooled to room temperature and about 1000 grams of ice-water was added. After seeding with some product nitrile crystals to allow the product to crystallize completely, the resulting white crystalline precipitate was filtered. The filter cake was washed with warm water and dried in the vacuum oven at 70° C and 15 mm Hg. vacuum. The dried crystalline precipitate was slurried with hot hexane to remove color bodies, yielding the nitrile product as white crystals melting at 126° to 128°.

c. 104 grams of the nitrile prepared in (b) was added slowly to a mixture of 115.2 grams of 50% aqueous sodium hydroxide and 64 grams of ethylene glycol at 80°. The temperature was gradually increased to keep the reaction product stirrable. After about 1 hours, reflux temperature was reached (120° C) and heating at reflux was continued for 6 hours. The reaction mixture was diluted with about 4 liters of water, warmed to dissolve the sodium carboxylate salt, and filtered to remove a little insoluble material. The clear filtrate was acidified with concentrated hydrochloric acid, the precipitated product filtered, and the filtercake vacuum dried at 80° C at 15 mm Hg. pressure. The product was obtained as a white powder melting at 213° to 217° C. Crystallization from acetonitrile raises the melting range to 214° to 218° C (Compound 26).

EXAMPLE 6

Methyl 5-tert.-butyl-2,3-dimethyl-4-hydroxyphenylacetate 11.8 grams of 5-tert.-butyl-2,3-dimethyl-4-hydroxyphenylacetic acid was added at 20° C to 200 ml of methanol previously saturated with hydrogen chloride gas. The slightly pinkish solution was heated at reflux (68° C) for 3 hours after which about one-half of the solvent was removed at reduced pressures and the reaction mixture then poured into about 500 ml of an ice-water mixture with stirring until all the ice had melted. The precipitated crystals were filtered, washed with water and dissolved in benzene. The benzene solution was successively washed with water, saturated sodium bicarbonate solution and finally with water to pH 7, the benzene solution being dried over anhydrous sodium sulfate. The clear benzene solution, freed of drying agent by filtration, was concentrated at reduced pressure. The resulting solid residue was triturated with hexane to remove color bodies. After recrystallization from methanol, the desired product was obtained as white crystals melting at 117° to 119° C (Compound 14).

EXAMPLE 7

N-Octadecyl 5-tert.-butyl-2,3-dimethyl-4-hydroxyphenylacetate 8.85 grams of 5-tert.-butyl-2,3-dimethyl-4-hydroxyphenylacetic acid, 9.45 grams of n-octadecanol and 0.665 grams of p-toluenesulfonic acid monohydrate were dispersed in 500 ml of toluene and heated at reflux for 7 hours. A little either was added to the cooled reaction mixture to prevent precipitation. The reaction solution was then successively washed with water, saturated sodium bicarbonate solution and water once again until neutral. After drying over anhydrous sodium sulfate and filtering, the clear filtrate was concentrated at reduced pressures. After washing with cold acetonitrile, the dried ground residue was crystallized from n-heptane yielding white crystals melting at 79° to 81° (Compound 15).

In a similar manner to Example 7, other 5-tert.-butyl-2,3-dimethyl-4-hydroxyphenylacetates were prepared as shown in Table II.

TABLE II

Other 5-tert.-butyl-2,3-dimethyl-4-hydroxyphenylacetates

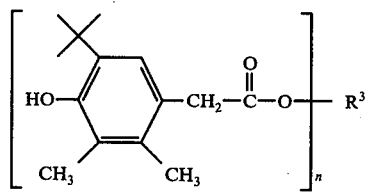

| Compound No. | $R^3$ | n | M.P.° C |
|---|---|---|---|
| 16 | n-$C_4H_9$— | 1 | 89–93 |
| 17 | n-$C_8H_{17}$— | 1 | 63–65 |
| 18 | n-$C_{12}H_{25}$— | 1 | 68–70 |
| 19 | —$CH_2$—$\underset{\underset{CH_3}{\mid}}{\overset{\overset{CH_3}{\mid}}{C}}$—$CH_2$— | 2 | 143–145 |
| 20 | —$(CH_2)_6$— | 2 | 152–155 |

EXAMPLE 8 p-tert.-Octylphenyl 3-(5-tert.-butyl-2,3-dimethyl-4-hydroxyphenyl)propionate

A stirred mixture of 3-(5-tert.-butyl-2,3-dimethyl-4-hydroxyphenyl)propionic acid (12.5 g., 0.05 mole) and thionyl chloride (7.5 g., 0.063 mole) in 250 ml of dry toluene containing a few drops of N,N-dimethylformamide was heated at 75° to 85° for 1 hour, precautions being taken to exclude moisture. p-Tert.-octylphenol (10.3 g, 0.05 mole) was added, and the mixture was stirred and refluxed for 18 hours. The solvent was evaporated under reduced pressure and the residue thus obtained was dissolved in ether. The ether solution was washed with 10% sodium carbonate solution and then water. Evaporation of the sodium sulfate dried ether solution afforded an oily residue which was dissolved in petroleum ether. On standing, a crystalline solid separated. Two recrystallizations of the material from hexane furnished the product as white crystals, m.p. 104.5° to 106.5° C (Compound 21).

By employing a similar procedure to that shown in Example 8, the compounds shown in Table III were prepared.

TABLE III

Other aryl 3-(5-tert.-butyl-2,3-dimethyl-4-hydroxyphenyl)propionates

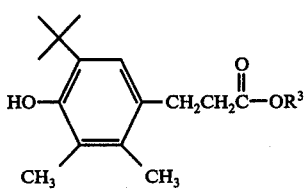

| Compound No. | Structure R³ | m.p. ° C |
|---|---|---|
| 22 | (phenyl) | 112–114 |
| 23 | (2-methylphenyl) | 90–92 |
| 24 | (2,5-di-tert-butylphenyl) | 138–140 |

EXAMPLE 9

Neopentanetriyl tris-(5-tert.-butyl-2,3-dimethyl-4-hydroxyphenylacetate)

24.2 grams of 5-tert.-butyl-2,3-dimethyl-4-hydroxyphenylacetic acid, 3.6 grams of 1,1,1-tri-methylolethane and 0.746 grams of dibutyltin oxide were dispersed in 35 ml of dry xylene and 3 ml of dry dimethyl sulfoxide and heated to distill out xylene solvent until a reflux temperature of 152° to 155° was reached. The reaction mixture then became homogeneous and was heated with stirring at this temperature for 18 hours, and then for an additional 6.5 hours at 157°–160°. The reaction mixture was dissolved in 800 ml chloroform and successively washed with water, saturated aqueous sodium bicarbonate solution and again with water until the pH of the wash water was neutral. The reaction solution was then dried over anhydrous sodium sulfate. The clear filtrate was evaporated at reduced pressures yielding a residue which became crystalline on trituration with a boiling mixture of 80 ml of hexane and 70 ml of toluene. After successive crystallizations from isopropanol and then toluene, the product was obtained as white crystals melting at 159°–164° (Compound 25).

By a procedure similar to Example 9, the coupounds presented in Table IV were prepared.

TABLE IV

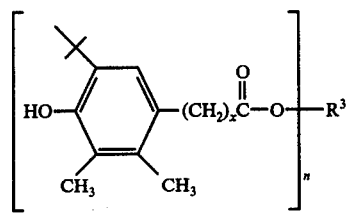

| Compound No. | x | n | R³ | M.P.° C |
|---|---|---|---|---|
| 27 | 1 | 2 | (—CH₂CH₂)₂S | 118–124 |
| 28 | 2 | 2 | (—CH₂CH₂)₂S | viscous syrup (1) |
| 29 | 1 | 4 | —CH₂—C(CH₂—)(CH₂—)CH₂— | 186–189 |

Note:
(1) Purified by silica gel column chromatography yielding a light yellow syrup.

EXAMPLE 10

2,2-Dimethyl-1,2,2-pentanetriyl tris-(5-tert.-butyl-2,3-dimethyl-4-hydroxyphenylacetate)

A mixture of 2.54 grams of 1,1,1-trimethylolbutane together with 13.5 grams of methyl 5-tert.-butyl-2,3-dimethyl-4-hydroxyphenylacetate and 13.7 milligrams of lithium hydride was heated together under nitrogen at 115° for 20 minutes, then 140° for 30 minutes, 170° for 1 hour, the mixture then being held at 190° to 195° for 4 hours. During this heating cycle the evolved methanol was removed by distillation. After removal of the unreacted methyl 5-tert.-butyl-2,3-dimethyl-4-hydroxyphenylacetate by distillation at reduced pressures, the residue was dissolved in benzene and the benzene solution was acidified with 1 ml of acetic acid. The benzene solution was freed of a small amount of insoluble material by filtration. The benzene solution containing product was then washed with 5% aqueous sodium carbonate and dried over sodium sulfate yielding the product in crude form as a glassy residue. After purification by dry-column chromatography using silica gel, the product was obtained as white crystals melting at 73° to 75° C after crystallization from a solvent mixture of benzene-hexane (Compound 30).

EXAMPLE 11

3,6-Dioxa-1,8-octamethylene bis-{3-(5-tert.-butyl-2,3-dimethyl-4-hydroxyphenyl)-propionate} a. 3-(5-tert.-butyl-2,3-dimethyl-4-hydroxyphenyl)-propionic acid

Under nitrogen, a solution of methyl 3-(5-tert.-butyl-2,3-dimethyl-4-hydroxyphenyl)propionate (71.5 g) in 150 ml of ethanol was treated with a solution of 98% sodium hydroxide (12.1 g) in 15 ml of water, and the mixture was heated under reflux for 3 hours. The cold solution was diluted with water to about 1200 ml and then acidified with concentrated hydrochloric acid. The precipitated solid was filtered off and washed with water. Recrystallization from 600 ml of acetonitrile gave the acid, m.p. 191° to 193° C.

b. A stirred mixture of 12.0 grams of 3-(5-tert.-butyl-2,3-dimethyl-4-hydroxyphenyl)propionic acid, 3.0 grams of triethylene glycol and 0.6 milliliters of titanium tetraisopropylate in 200 ml of dry xylene was heated at reflux for 18 hours, the evolved water being removed by azeotropic distillation. The xylene was removed by distillation at reduced pressures and the residue obtained taken up in ether. The ether solution was clarified by filtration and dried over sodium sulfate after removal of the drying agent by distillation at reduced pressures. The product was purified by drycolumn chromatography using silica gel as absorbent. The product was obtained as a colorless glass (Compound 31).

EXAMPLE 12

Ethylene bis-{3-(5-tert.-butyl-2,3-dimethyl-4-hydroxyphenyl)-propionate}

This compound was prepared in a similar manner by substituting ethylene glycol for triethylene glycol in Example 11. After crystallization from a solvent mixture of benzene-heptane, the product was obtained as white crystals melting at 148° to 150° (Compound 32).

Unstabilized polypropylene powder (Hercules Profax 6501) was thoroughly blended with 0.2% by weight of the indicated stabilizer compound. Also prepared were samples of polypropylene containing 0.1% by weight of the same stabilizer and 0.3% by weight of distearyl β-thiodipropionate (DSTDP). The blended materials were then milled on a two-roll mill at 182° C for 10 minutes, after which time the stabilized polypropylene was sheeted from the mill and allowed to cool.

The milled polypropylene sheets were then cut into pieces and pressed for 7 minutes on a hydraulic press at 218° C, 19.25 Kg/cm$^2$ pressure. The resulting plaques of 0.635 mm thickness were tested for resistance to accelerated aging in a forced draft oven at 150° C. When the plaques showed the first signs of decomposition (e.g., cracking or brown edges) they were considered to have failed. The results are shown in Table V below.

TABLE V
Oven Aging of Polypropylene Plaques Containing 2,3,5-Trialkyl-4-hydroxyphenyl Alkanoates

| Ex. No. | Percent Stabilizer | Hours to Failure |
|---|---|---|
| 13 | Unstabilized | 3 |
| 14 | 0.2% Compound 16 | < 20 |
| 15 | 0.1% Compound 16 + 0.3% DSTDP | 205 |
| 16 | 0.2% Compound 17 | < 20 |
| 17 | 0.1% Compound 17 + 0.3% DSTDP | 220 |
| 18 | 0.2% Compound 18 | <20 |
| 19 | 0.1% Compound 18 + 0.3% DSTDP | 250 |
| 20 | 0.2% Compound 15 | 45 |
| 21 | 0.1% Compound 15 + 0.3% DSTDP | 215 |
| 22 | 0.2% Compound 4 | 55 |
| 23 | 0.1% Compound 4 + 0.3% DSTDP | 1070 |
| 24 | 0.2% Compound 2 | < 20 |
| 25 | 0.1% Compound 2 + 0.3% DSTDP | 155 |
| 26 | 0.2% Compound 8 | 25 |
| 27 | 0.1% Compound 8 + 0.3% DSTDP | 1110 |
| 28 | 0.2% Compound 3 | < 20 |
| 29 | 0.1% Compound 3 + 0.3% DSTDP | 200 |
| 30 | 0.2% Compound 9 | 175 |
| 31 | 0.1% Compound 9 + 0.3% DSTDP | 795 |
| 32 | 0.2% Compound 7 | < 20 |
| 33 | 0.1% Compound 7 + 0.3% DSTDP | 115 |
| 34 | 0.2% Compound 6 | < 20 |
| 35 | 0.1% Compound 6 + 0.3% DSTDP | 110 |
| 36 | 0.2% Compound 21 | 25 |
| 37 | 0.1% Compound 21 + 0.3% DSTDP | 205 |
| 38 | 0.2% Compound 24 | < 20 |
| 39 | 0.1% Compound 24 + 0.3% DSTDP | 125 |
| 40 | 0.2% Compound 23 | < 20 |
| 41 | 0.1% Compound 23 + 0.3% DSTDP | 150 |
| 42 | 0.2% Compound 22 | < 20 |
| 43 | 0.1% Compound 22 + 0.3% DSTDP | 140 |
| 44 | 0.2% Compound 19 | 45 |
| 45 | 0.1% Compound 19 + 0.3% DSTDP | 250 |
| 46 | 0.2% Compound 10 | 190 |
| 47 | 0.1% Compound 10 + 0.3% DSTDP | 1590 |
| 48 | 0.2% Compound 20 | 25 |
| 49 | 0.1% Compound 20 + 0.3% DSTDP | 1130 |
| 50 | 0.2% Compound 11 | 240 |
| 51 | 0.1% Compound 11 + 0.3% DSTDP | 2270 |
| 52 | 0.2% Compound 25 | 75 |
| 53 | 0.1% Compound 25 + 0.3% DSTDP | 2520 |
| 54 | 0.2% Compound 29 | 75 |
| 55 | 0.1% Compound 29 + 0.3% DSTDP | 2100 |
| 56 | 0.2% Compound 12 | 105 |
| 57 | 0.1% Compound 12 + 0.3% DSTDP | 1510 |
| 58 | 0.2% Compound 27 | 140 |
| 59 | 0.1% Compound 27 + 0.3% DSTDP | 965 |
| 60 | 0.2% Compound 28 | 480 |
| 61 | 0.1% Compound 28 + 0.3% DSTDP | 1225 |
| 62 | 0.2% Compound 13 | 190 |
| 63 | 0.1% Compound 13 + 0.3% DSTDP | 1545 |
| 64 | 0.2% Compound 5 | 1005 |
| 65 | 0.1% Compound 5 + 0.3% DSTDP | 1750 |
| 66 | 0.2% Compound 30 | 80 |
| 67 | 0.1% Compound 30 + 0.3% DSTDP | 1760 |
| 68 | 0.2% Compound 31 | 215 |
| 69 | 0.1% Compound 31 + 0.3% DSTDP | 1195 |
| 70 | 0.2% Compound 32 | 110 |
| 71 | 0.1% Compound 32 + 0.3% DSTDP | 590 |

The stabilizers are particularly effective in the presence of a thio ester co-stabilizer such as DSTDP.

EXAMPLE 72

Pellets (500 g) of unstabilized nylon-6,6 (Zytel 101, DuPont) are placed in a Kitchen Aid Mixer. With mixing a solution of 0.5% (based on the weight of nylon) of n-octadecyl 3-(5-t-butyl-2,3-diethyl-4-hydroxyphenyl)-propionate in 20 ml of methylene chloride is added slowly. Sodium hypophosphite (0.5 gm 0.1%) is dissolved in 20 ml of water and added slowly with mixing to the nylon pellets after the antioxidant solution has been added and most of the methylene chloride has evaporated. The stabilized pellets are dried at 80° C at <<1 mm Hg. for 4 hours.

The polyamide formulation is extruded at 315.6° C through a 0.635 cm die into a rod which is water cooled and chopped into pellets. A 1.905 cm Brabender extruder, equipped with a nylon screw, is used. The pellets are dried at 80° C at <1mm for 4 hours.

The dried pellets are compression molded into 0.127 mm thick film by pressing at 290° C for 4 minutes at 57.75 Kg/cm$^2$. The films are oven aged at 150° C in a forced draft oven and samples are removed periodically. The specific viscosity of the samples are determined using a 1% formic acid solution at 25° C. The sample stabilized with the above noted stabilizer required longer aging time to reduce its viscosity by one-half than the unstabilized sample.

EXAMPLE 73

Unstabilized high impact polystyrene resin is dry blended with 0.01% by weight of the resin of 2-(n-octylthio)ethyl 5-t-butyl-2,3-dimethyl-4-hydroxyphenylacetate. The resin is then extrusion compounded on a 2.54 cm 24/1=L/D extruder, melt temperature 260° C and pressed for 7 minutes at a temperature of 163° C and a pressure of 140 Kg/cm$^2$ into a sheet of uniform thickness of 2.54 mm. The sheets are then cut into plaques of 5.08 cm × 5.08 cm. The plaques are then oven aged at 80° C and color measurements made periodically using a Hunter Color Difference Meter Model D25. The polystyrene samples stabilized with the above stabilizer develops the undesirable yellow discoloration substantially later than the time that such discoloration occured in the unstabilized samples.

EXAMPLE 74

Unstabilized linear polyethylene (HiFax 4401) is solvent blended in methylene chloride with 0.2% by weight of the substrate of ethylene bis[3-(5-isopropyl-2,3-dimethyl-4-hydroxyphenyl)propionate] and then vacuum dried. The resin is then extruded at 232.2° C using a 1.905 cm extruder having a 24:1 L/D ratio. The melt flow rate of a sample of the resin is determined after each extrusion according to ASTM test D-1238. Polyethylene stabilized with above compound is found to undergo less change in the melt flow rate than the unstabilized polyethylene.

EXAMPLE 75

A quantity of SBR emulsion containing 100 g of rubber (500 ml of a 20% SBR emulsion obtained commercially from Texas U.S. as Synpol 1500) previously stored under nitrogen, is placed in a beaker and stirred vigorously. The pH of the emulsion is adjusted to 10.5 with a 0.5N NaOH solution.

To the emulsion is added 50 ml of 25% NaCl solution. A 6% NaCl solution adjusted with hydrochloric acid to a pH 1.5 is added in a thin stream with vigorous stirring. When pH 6.5 is reached, the rubber begins to coagulate and the addition is slowed down in order to maintain uniform agitation. The addition of the acidic 6% NaCl solution is terminated when a pH 3.5 is reached. The coagulated crumb-rubber slurry at pH 3.5 is stirred for ½ hour.

The coagulated rubber is isolated by filtration through cheese cloth, and rinsed with distilled water. After three subsequent washings with fresh distilled water, the coagulated rubber is dried, first at 25 mm Hg and finally to constant weight under high vacuum (< 1 mm) at 40 to 45° C.

The dried rubber (25 g) is heated under nitrogen at 125° C in a Brabender mixer and to this is added with mixing 0.1% of 1,8-octamethylene bis-[4-(2,3,5-trimethyl-4-hydroxyphenyl)butyrate.

Portions of the rubber are oven aged at 100° C. At various intervals gel content is determined on the rubber. The rubber stabilized with the above compound shows much less gel formation than the unstabilized sample.

EXAMPLE 76

To 50 g of polyacetal resin containing 0.1% of an acid scavenger, dicyandiamide, is added 0.2% by weight of phenyl(5-t-octyl-2,3-dimethyl-4-hydroxy-phenyl)acetate, and milled for 7 minutes at 200° C in a Brabender Plasti-recorder. The milled formulation is subsequently pressed into a 1.016 mm sheet at 215° C at 24.5 Kg/cm² for 90 seconds then cooled quickly in a cold press at 24.5 Kg/cm². The stabilized sheets are then remolded for 2 minutes at contact pressure and for 3 minutes at 21 Kg/cm² at 215° C to give plaques 3.81 cm × 5.715 cm × 3.175 mm. The plaques are aged in the oven at 60° C and the weight loss of the specimen is determined periodically until a 4% weight loss is reached. The stabilized sample takes a much longer time to reach this 4% weight loss than does the unstabilized sample.

EXAMPLE 77

Unstabilized, thoroughly dried polyethylene terephthalate chips are dry blended with 1.0% of 3,6-dioxa-1,8-octamethylene bis-[3-(5-t-butyl-2,3-dimethyl-4-hydroxyphenyl)propionate]. 60/10 denier multifilament is melt spun at a melt temperature of 290° C and cold oriented 3 to 1. The oriented fibers are wound into skeins and oven aged at 140° C. The stabilized material exhibits greater retention of tensile strength after 24 hours than the unstabilized material.

EXAMPLE 78

A stabilized high temperature lubricating oil is prepared by incorporating 0.05% by weight of 2,2-dimethyl-1,2,2-pentanetriyl tris-[3-(5-t-butyl-2,3-dimethyl-4-hydroxyphenyl)propionate] to the lubricant which comprises diisoamyl adipate. The stabilized composition is compared with the unstabilized lubricant by heating at 175° C in the presence of air and metallic catalysts according to the test method described in Military Specification Mil-I-7808c. After 72 hours, the blank containing no stabilizer contains more sludge and has a greater viscosity than the stabilized lubricant.

EXAMPLE 79

N-Methyl-3-(2,3-dimethyl-5-tert.-butyl-4-hydroxyphenyl)propionamide

A mixture consisting of 450 ml of dimethyl sulfoxide 29.4 g methylamine, and 5.04 g of 57% oil dispersion of sodium hydride (=0.1197 moles) was stirred at 25° C for 3¼ hours. 15.1 g methyl 3(5-tert.-butyl-2,3-dimethyl-4-hydroxyphenyl)propionate was then added and the resulting mixture stirred 18 hours at 25° C. The reaction mixture was then neutralized with 1 glacial acetic acid, diluted with water, and extracted with ether. The ether extracts were combined and washed with sodium hydroxide and water and dried over anhydrous sodium sulfate. After removal of the ether by distillation, crystallization of the residue from toluene yielded white crystals melting at 125° to 128° (Compound 33).

EXAMPLE 80

N-Methyl-N-n-octadecyl-(5-tert.-butyl-2,3-dimethyl-4-hydroxyphenyl)acetamide

A mixture consisting of 8.76 g of methyl 2,3-dimethyl-5-t-butyl-4-hydroxyphenyl acetate and 11.87 g of N-methyl-N-n-octadecylamine was heated under nitrogen at 165° to 180° for 5 hours then at 180° to 187° for an additional 3 hours. The methanol of reaction was removed continuously by distillation. The product was purified by two crystallizations from ethanol, and was obtained as a white solid having melting point 99° to 102° C (Compund 34).

N-n-dodecyl-(5-tert.-butyl-2,3-dimethyl-4-hydroxyphenyl)acetamide is made by an analogous procedure by substituting n-dodecylamine for N-methyl-N-n-octadecylamine.

EXAMPLE 81

N-n-Octadecyl-3-(5-tert.-butyl-2,3-dimethyl-4-hydroxyphenyl)propionamide

A mixture consisting of 10.6 grams of methyl 3-(5-tert.-butyl-2,3-dimethyl-4-hydroxyphenyl)propionate and 11.9 grams of n-octadecylamine were heated together for 1 hour at 160° to 165° and then at 175° to 180° for four hours, the methanol of reaction being removed continuously by distillation. Crystallization from methanol yielded white crystals melting at 85° to 87° (Compound 35).

EXAMPLE 82

N,N'-Ethylenebis-{3-(5-tert.-butyl-2,3-di-methyl-4-hydroxyphenyl)propionamide}

A mixture consisting of 22.21 grams of methyl 3-(5-tert.-butyl-2,3-dimethyl-4-hydroxyphenyl)propionate and 2.4 grams of ethylenediamine were melted together and gradually heated from 91° to 172° over a period of 18.5 hours and then maintained at 172° for an additional 2 hours while removing the methanol of reaction by distillation. The product was successively crystallized from a solvent mixture of ethanol-water and then from acetonitrile to yield white crystals melting at 214° to 217° (Compound 36).

N,N'-1,2-propylenebis-{3-(5-tert.-butyl-2,3-dimethyl-4-hydroxyphenyl)propionamide} is made in a similar manner by substituting 1,2-propylenediamine for ethylenediamine in the above procedure.

EXAMPLE 83

N,N'-Hexamethylenebis-{3-(5-tert.-butyl-2,3-dimethyl-4-hydroxyphenyl)propionamide}

This product was made by a similar procedure as that described in Example 82 by substituting 1,6-hexanediamine for ethylenediamine. After successive crystallization from a solvent mixture of carbon tetrachloride-1,2-dichloroethane, methanol-water and finally from chloroform, the product was obtained as white crystals melting at 176° to 178° (Compound 37).

N,N'-dodecamethylenebis-{3-(5-tert.-butyl-2,3-dimethyl-4-hydroxyphenyl)propionamide} is made by a similar procedure to that described in Example 82 by substituting 1,2-dodecamethylenediamine for ethylenediamine.

EXAMPLE 84

N,N'-Bis-{3-(5-tert.-butyl-2,3-dimethyl-4-hydroxyphenyl)propionyl}piperazine

A mixture consisting of 20.0 grams of methyl 3-(5-tert.-butyl-2,3-dimethyl-4-hydroxyphenyl)propionate and 3.1 grams of piperazine was gradually heated from 120° to 175° over 6.5 hours and maintained at 175° to 180° for an additional 4 hours in a nitrogen atmosphere while removing the methanol of reaction by distillation. The reaction product was purified by repeated extractions with fresh hot toluene and finally with 95% ethanol to yield the purified product as a white solid melting at 221° to 224° (Compound 38).

EXAMPLE 85

N,N'-3,6-Dioxa-1,8-octamethylenebis-[3-(5-tert-butyl-2,3-dimethyl-4-hydroxyphenyl)propionamide]

A mixture consisting of 18.9 grams of methyl 3-(5-t-butyl-2,3-dimethyl-4-hydroxyphenyl)propionate and 5.0 grams (0.034 moles) of 3,6-dioxa-1,8-octanediamine was heated under a nitrogen atmosphere for 7½ hours during which time the temperature was gradually raised from 135° to 175°. Heating was continued for 6½ hours longer at 175° to 180°. The methanol by-product weighed 20.53 g. The product was purified by extractions with 5% hydrochloric acid and water. Final purification was achieved by means of chromatography using alumina and chloroform. This afforded 4.9 grams of a white glass having melting point 72° to 95° (Compound 39).

Oven aging tests were run on compounds 33 to 39 using the same procedures of sample preparation and evaluation as detailed for Table V. The results of these oven aging tests are listed in Table VI.

TABLE VI

Oven Aging of Polypropylene Plaques Containing 2,3,5-Trialkyl-4-hydroxyphenyl Alkanamides

| Ex. No | Percent Stabilizer | Hours to Failure |
|---|---|---|
| 86 | Unstabilized | 3 |
| 87 | 0.2% Compound 33 | < 20 |
| 88 | 0.1% Compund 33 + 0.3% DSTDP | 165 |
| 89 | 0.2% Compound 34 | 105 |
| 90 | 0.1% Compound 34 + 0.3% DSTDP | 735 |
| 91 | 0.2% Compound 35 | 175 |
| 92 | 0.1% Compund 35 + 0.3% DSTDP | 950 |
| 93 | 0.2% Compound 36 | 105 |
| 94 | 0.1% Compound 36 + 0.3% DSTDP | 750 |
| 95 | 0.2% Compound 37 | 90 |
| 96 | 0.1% Compound 37 + 0.3% DSTDP | 780 |
| 97 | 0.2% Compound 38 | 65 |
| 98 | 0.1% Compound 38 + 0.3% DSTDP | 1855 |
| 99 | 0.2% Compound 39 | 100 |
| 100 | 0.1% Compound 39 + 0.3% DSTDP | 415 |

What is claimed is:

1. A composition of matter comprising an organic material subject to deterioration and from 0.01 to 5% by weight of a stabilizing compound of the formula

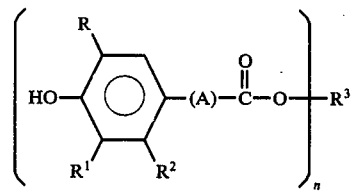

wherein
R is a branched alkyl of 3 to 8 carbon atoms,
$R^1$ and $R^2$ are alkyl of 1 to 3 carbon atoms or together are a butylene chain which together with the phenyl ring form a tetrahydronaphthyl group,
$R^3$ is alkyl of 1 to 18 carbon atoms; cyclohexyl; phenyl; o-tolyl; p-tert-octyphenyl; 2,4-di-tert-butylphenyl; 2-(alkylthio)ethyl of 5 to 21 atoms in the chain; alkylene of 2 to 6 carbon atoms, thiodiethylene, 3,6-dioxa-1,8-octa-methylene; or a polyvalent saturated aliphatic hydrocarbon radical of 3 7 carbon atoms where n is 3 or 4,
A is a straight chain alkylene of 1 to 3 carbon atoms, and n is an integer of 1 to 4.

2. A composition according to claim 1 where in the stabilizing compound
R is tert-butyl,
$R^1$ and $R^2$ are methyl,
$R^3$ is alkyl of 1 to 18 carbon atoms; 2-(n-octadecylthio)ethyl; alkylene of 2 to 6 carbon atoms; thiodiethylene; 3,6-dioxa-1,8-ocatmethylene; or a polyvalent saturated aliphatic hydrocarbon radical of 5 to 7 carbon atoms where n is 3 or 4,
A is methylene or ethylene, and
n is an integer of 1 to 4.

3. A composition of claim 8 wherein the stabilizing compound is n-octadecyl 3-(5-tert-butyl-2,3-dimethyl-4-hydroxyphenyl)propionate.

4. A composition of claim 1 wherein the stabilizing compound is 2-(n-octadecylthio)ethyl 3-(5-tert-butyl-2,3-dimethyl-4-hydroxyphenyl)propionate.

5. A composition of claim 8 wherein the stabilizing compound is 2,2-dimethylpropylene bis-[3-(5-tert-butyl-2,3-dimethyl-4-hydroxyphenyl)propionate].

6. A composition of claim 8 wherein the stabilizing compound is 1,6-hexamethylene bis-[3-(5-tert-butyl-2,3-dimethyl-4-hydroxyphenyl)propionate].

7. A composition of claim 8 wherein the stabilizing compound is neopentanetetrayl tetrakis-(5-tert-butyl-2,3-dimethyl-4hydroxyphenylacetate).

8. A composition of claim 1 containing additionally from 0 to 2% by weight of the thio co-stabilizer having the formula

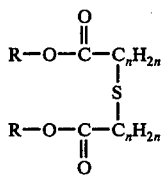

wherein R is alkyl of 6 to 24 carbons and $n$ is 1 to 6.

9. A composition of claim 1 containing additionally from 0 to 5% by weight of a light stabilizer.

10. A composition of claim 1 wherein the organic material is polyolefin.

11. A composition of claim 10 wherein the organic material is polypropylene.

12. A composition of claim 8 wherein the stabilizing compound is neopentanetriyl tris-(5-tert-butyl-2,3-diemthyl-4hydroxypehnylacetate).

13. A composition of matter comprising an organic material subject to deterioration and from 0.01 to 5% by weight of a stabilizing compound of the formula

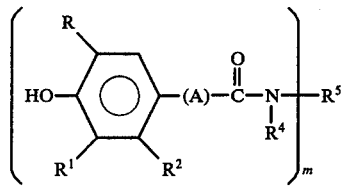

wherein
R is a branched alkyl of 3 to 8 carbon atoms,
$R^1$ and $R^2$ are alkyl of 1 to 3 carbon atoms,
$R^4$ is hydrogen or alkyl of 1 to 4 carbon atoms,
$R^5$ is alkylene of 2 to 12 carbon atoms or 3,6-dioxa-1,8-octamethylene, or $R^4$ and $R^5$ together form a piperazinyl ring incorporating both nitrogen atoms when $m$ is 2,
A is a straight chain alkylene of 1 to 3 carbon atoms, and
$m$ is 2.

14. A composition according to claim 13 wherein the stabilizing compound
R is tert-butyl,
$R^1$ and $R^2$ are methyl
$R^4$ is hydrogen or methyl,
$R^5$ is alkylene of 2 to 6 carbon atoms or 3,6-dioxa-1,8-octamethylene, or $R^4$ and $R^5$ togehter form a piperazinyl ring incorporating both nitrogen atoms when $m$ is 2,
A is methylene or ethylene, and
$m$ is 2.

15. A composition according to claim 13 wherein the stabilizing compound
R is tert-butyl,
$R^1$ and $R^2$ are methyl,
$R^4$ is hydrogen,
$R^5$ is alkylene of 2 to 6 carbon atoms, or $R^4$ and $R^5$ toether form a piperazinyl ring incorporating both nitrogen atoms when $m$ is 2,
A is ethylene, and
$m$ is 2.

16. A composition according to claim 13 containing from 0 to 2% by weight of a co-stabilizer having the formula

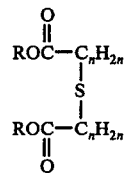

wherein R is alkyl of 6 to 24 carbons and $n$ is 1 to 6.

17. A composition according to claim 13 containing additionally from 0 to 5% by weight of a light stabilizer.

18. A composition according to claim 13 wherein the organic material is polyolefin.

19. A composition according to claim 18 wherein the polyolefin is polyporpylene.

20. A composition according to claim 16 wherein the stabilizing compound is N,N'-ethylenebis-[3-(5-tert-butyl-2,3-dimethyl-4-hydroxyphenyl)propionamide].

21. A composition according to claim 16 wherein the stabilizing compound is N,N'-hexamethylenebis-[3-(5-tert-butyl-2,3-dimethyl-4-hydroxyphenyl)propionamide].

22. A composition according to claim 16 wherein the stabilizing compound is N,N'-bis-[3-(5-tert-butyl-2,3-dimethyl-4-hydroxyphenyl)propionyl]piperazine.

* * * * *